(12) United States Patent
Mishra et al.

(10) Patent No.: US 9,973,963 B2
(45) Date of Patent: May 15, 2018

(54) VIRTUAL GUARD BANDS

(71) Applicant: Parallel Wireless, Inc., Nashua, NH (US)

(72) Inventors: Rajesh Kumar Mishra, Westford, MA (US); Yang Cao, Westford, MA (US); Michael Yasuhiro Saji, Brookline, MA (US)

(73) Assignee: Parallel Wireless, Inc., Nashua, NH (US)

( * ) Notice: Subject to any disclaimer, the term of this patent is extended or adjusted under 35 U.S.C. 154(b) by 40 days.

(21) Appl. No.: 15/149,941

(22) Filed: May 9, 2016

(65) Prior Publication Data

US 2016/0330645 A1    Nov. 10, 2016

Related U.S. Application Data

(60) Provisional application No. 62/158,192, filed on May 7, 2015, provisional application No. 62/166,401, filed on May 26, 2015.

(51) Int. Cl.
*H04J 3/00* (2006.01)
*H04W 28/02* (2009.01)
*H04W 28/16* (2009.01)
*H04W 28/26* (2009.01)
*H04W 72/04* (2009.01)

(52) U.S. Cl.
CPC ... *H04W 28/0236* (2013.01); *H04W 28/0273* (2013.01); *H04W 28/16* (2013.01); *H04W 28/26* (2013.01); *H04W 72/0426* (2013.01)

(58) Field of Classification Search
CPC ............ H04W 28/0236; H04W 28/16; H04W 28/0273; H04W 72/0426; H04W 28/26
See application file for complete search history.

(56) References Cited

U.S. PATENT DOCUMENTS

| 8,761,080 | B2 | 6/2014 | Mese et al. |
| 8,909,157 | B2 | 12/2014 | Kruglick |
| 2006/0116118 | A1 | 6/2006 | Charriere et al. |
| 2009/0274073 | A1* | 11/2009 | Sutton ............. H04W 4/20 370/280 |

(Continued)

FOREIGN PATENT DOCUMENTS

WO    2013048582 A1    4/2013

OTHER PUBLICATIONS

Mohamad Yassin, Mohamed A. Aboulhassan, Samer Lahoud, Marc Ibrahim, Dany Mezher, Bernard Cousin, and Essam A. Sourour, "Survey of ICIC Techniques in LTE Network under Various Mobile Environment Parameters," Wireless Networks, Dec. 24, 2015.

(Continued)

*Primary Examiner* — Clemence Han
(74) *Attorney, Agent, or Firm* — Michael Y. Saji

(57) ABSTRACT

A radio resource scheduler at a first base station may be configured to: identify radio frequency resources in use by the first base station, identify radio frequency resources to be reserved as virtual guard bands to reduce adjacent band interference, and install virtual guard band rules for reducing interference with adjacent bands. The virtual guard band information may be hints, allocations, priorities, reservations, or scheduling instructions for avoiding certain radio resources, radio resource blocks, or frequencies.

26 Claims, 5 Drawing Sheets

(56) References Cited

U.S. PATENT DOCUMENTS

| | | |
|---|---|---|
| 2010/0216478 A1 | 8/2010 | Buddhikot et al. |
| 2010/0222065 A1 | 9/2010 | De Pasquale et al. |
| 2012/0008591 A1 | 1/2012 | Miki et al. |
| 2012/0039268 A1* | 2/2012 | Hakkinen ............... H04L 5/001 370/329 |
| 2012/0087266 A1 | 4/2012 | Vajapeyam et al. |
| 2012/0294163 A1* | 11/2012 | Turtinen ............. H04W 72/042 370/252 |
| 2012/0307749 A1* | 12/2012 | Banister ............... H04B 1/0475 370/329 |
| 2014/0050128 A1 | 2/2014 | Campoy Cervera et al. |
| 2014/0056277 A1* | 2/2014 | HomChaudhuri H04W 72/1257 370/330 |
| 2014/0226481 A1 | 8/2014 | Dahod et al. |
| 2014/0355596 A1 | 12/2014 | Juncker et al. |
| 2015/0063373 A1 | 3/2015 | Savaglio et al. |
| 2016/0088534 A1 | 3/2016 | Axmon et al. |
| 2016/0094968 A1 | 3/2016 | Papa et al. |
| 2016/0227916 A1 | 11/2016 | Deenoo et al. |

OTHER PUBLICATIONS

3rd Generation Partnership Project, 3GPP TS 32.432 V10.0.0 (Mar. 2010), "3rd Generation Partnership Project; Technical Specification Group Services and System Aspects; Telecommunication management; Performance measurement; File format definition (Release 10)," Mar. 2010, V10.0.0.

Dai Kimura and Hiroyuki Seki, "Inter-Cell Interference Coordination (ICIC) Technology," Fujitsu Scientific & Technical Journal, vol. 48, No. 1, Jan. 2012, retrieved from http://www.fujitsu.com/global/documents/about/resources/publications/fstj/archives/vol48-1/paper16.pdf.

Maissa Boujelben, Sonia Benrejeb, and Sami Tabbane, "Interference Coordination Schemes for Wireless Mobile Advanced Systems: A Survey," IOSR Journal of Electronics and Communication Engineering (IOSR-JECE), vol. 9, Issue 1, Feb. 2014, retrieved from http://arxiv.org/pdf/1403.3818.pdf.

3rd Generation Partnership Project, 3GPP TS 36.331 V10.7.0 (Sep. 2012), "3rd Generation Partnership Project; Technical Specification Group Radio Access Network; Evolved Universal Terrestrial Radio Access (E-UTRA); Radio Resource Control (RRC); Protocol specification (Release 10)," Sep. 2012, V10.7.0.

3rd Generation Partnership Project, 3GPP TS 36.331 V8.21.0 (Jun. 2014), "3rd Generation Partnership Project; Technical Specification Group Radio Access Network; Evolved Universal Terrestrial Radio Access (E-UTRA); Radio Resource Control (RRC); Protocol specification (Release 8)," Jun. 2014, V8.21.0.

3rd Generation Partnership Project, 3GPP TS 36.314 V9.1.0 (Jun. 2010), "3rd Generation Partnership Project; Technical Specification Group Radio Access Network; Evolved Universal Terrestrial Radio Access (E-UTRA); Layer 2—Measurements (Release 9)," Jun. 2010, V9.1.0.

3rd Generation Partnership Project, 3GPP TS 36.214 V10.1.0 (Mar. 2011), "3rd Generation Partnership Project; Technical Specification Group Radio Access Network; Evolved Universal Terrestrial Radio Access (E-UTRA); Physical layer; Measurements (Release 10)," Mar. 2011, V10.1.0.

3rd Generation Partnership Project, 3GPP TS 23.203 V10.4.0 (Jun. 2011), "3rd Generation Partnership Project; Technical Specification Group Services and System Aspects; Policy and charging control architecture (Release 10)," Jun. 2011, V10.4.0.

3rd Generation Partnership Project, 3GPP TR 37.803 V11.1.0 (Dec. 2012), "3rd Generation Partnership Project; Technical Specification Group Radio Access Network; Universal Mobile Telecommunications System (UMTS) and LTE; Mobility enhancements for Home Node B (HNB) and Home enhanced Node B (Release 11)," Dec. 2012, V11.1.0.

3rd Generation Partnership Project, 3GPP TS 36.423 V10.1.0 (Mar. 2011), "3rd Generation Partnership Project; Technical Specification Group Radio Access Network; Evolved Universal Terrestrial Radio Access Network (E-UTRAN); X2 Application protocol (X2AP) (Release 10)," Mar. 2011, V10.1.0.

3rd Generation Partnership Project, 3GPP TS 36.300 V12.5.0 (Mar. 2015), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Mar. 2015, V12.5.0.

3rd Generation Partnership Project, "Overview of 3GPP Release 10 V0.2.1," Jun. 2014.

Dai Kimura, Yuya Harada, and Hiroyuki Seki, "De-Centralized Dynamic ICIC Using X2 Interfaces for Downlink LTE Systems," Vehicular Technology Conference (VTC Spring), 2011 IEEE 73rd.

Michelle M. Do and Harrison J. Son, "Interference Coordination in LTE/LTE-A (2): eICIC," Netmanias, Aug. 6, 2014 retrieved from http://www.netmanias.com/en/?m=view&id=blog&no=6551&xtag=lte-lte-a-eicic&xref=interference-coordination-in-lte-lte-a-2-eicic-enhanced-icic&vm=pdf.

Michelle M. Do and Harrison J. Son, "Interference Coordination in LTE/LTE-A (1): ICIC," Netmanias, Jun. 5, 2014 retrieved from http://www.netmanias.com/en/?m=view&id=blog&no=6391&xtag=icic-interference-coordination-lte-lte-a&xref=interference-coordination-in-lte-lte-a-1-inter-cell-interference-coordination-icic&vm=pdf.

Nicola Logli, "Managing Cell Edge Issues," New Electronics, Apr. 14, 2015, retrieved from http://www.newelectronics.co.uk/article-images/75868/P27-28.pdf.

Zahid Ghadialy, "eICIC: Enhanced Inter-Cell Interference Coordination in 3GPP Release 10," The 3G4G Blog, Jan. 5, 2011, retrieved from http://blog.3g4g.co.uk/2011/01/eicic-enhanced-inter-cell-interference.html.

* cited by examiner

VIRTUAL GUARD BANDS

CROSS-REFERENCE TO RELATED APPLICATIONS

This application claims the benefit of priority under 35 U.S.C. § 119(e) of U.S. Provisional Patent Application No. 62/158,192, filed on May 7, 2015 and entitled "Virtual Guard Bands," and U.S. Provisional Patent Application No. 62/166,401, filed on May 26, 2015 and entitled "Inter-Cell Interference Coordination," which are hereby incorporated by reference in their entirety for all purposes. The present application also hereby incorporates by reference U.S. patent application Ser. No. 14/542,544, "Adjacent Channel Interference Cancellation in Multi-Channel Systems," filed Nov. 14, 2014; U.S. patent application Ser. No. 14/642,544, "Federated X2 Gateway," filed Mar. 9, 2015; and U.S. patent application Ser. No. 14/828,432, "Inter-Cell Interference Mitigation," filed Aug. 17, 2015, each in its entirety for all purposes.

The following documents are also incorporated by reference in their entirety for all purposes: 3GPP TS 36.331, version 10.7.0, "Radio Resource Control (RRC); Protocol specification"; 3GPP TS 36.331, version 8.21.0, "Radio Resource Control (RRC); Protocol specification"; 3GPP TS 36.314, version 9.1.0, "Layer 2—Measurements"; 3GPP TS 36.214, version 10.1.0, "Physical Layer; Measurements"; 3GPP TS 23.203, version 10.4.0, "Policy and charging control architecture"; 3GPP TS 37.803-b10, version 11.1.0, "Mobility enhancements for Home Node B and Home enhanced Node B"; 3GPP TS 36.423, version 10.1.0, "X2 Application Protocol (X2AP)"; 3GPP TS 36.600, "E-UTRA and E-UTRAN; Overall Description"; and 3GPP Rel-10_description_20140630.

BACKGROUND

In a situation wherein backhaul and access radio interfaces are co-located and/or in the same radio band, it is difficult to isolate the interfaces to avoid or prevent cross-interference with each other without bulky, expensive, and power-hungry filters and amplifiers.

Typically, a guard band is an intentionally unused part of the radio spectrum between two radio bands, or on either side of a single designated radio band, left unused for the purpose of preventing interference. By separating two wider frequency ranges, guard bands help to ensure that both can transmit simultaneously without interfering with each other. Typically, in order to ensure that certain frequencies are not used, filters are required.

LTE has built-in guard bands between designated bands. In LTE, guard bands of 1 MHz on either side of a designated band are common. As LTE is sensitive to interference, rigorous filtering is required for these guard bands, which requires high-performance and expensive filters.

Fractional frequency reuse (FFR) and/or inter-cell interference coordination (ICIC) are techniques used in wireless networks for reducing interference. In particular, interference is reduced for users at the edge of a base station's coverage region (called cell edge users). As implied by the name of the technique, interference in a given cell is reduced by coordination of potentially interfering transmissions from a base station in another cell.

SUMMARY

In one embodiment, a system is disclosed, comprising: a radio resource scheduler at a first base station configured to: identify radio frequency resources in use by the first base station, identify radio frequency resources to be reserved as virtual guard bands to reduce adjacent band interference, and install virtual guard band rules for reducing interference with adjacent bands; and a base station coordination node in communication with the base station configured to: answer queries regarding radio frequencies in use by neighboring base stations; receive virtual guard band information from the first base station; and send virtual guard band information to a second base station.

The virtual guard band information may be hints, allocations, priorities, reservations, or scheduling instructions for avoiding certain radio resources, radio resource blocks, or frequencies. The radio resource scheduler may be coupled to an access transceiver and a backhaul transceiver, each at the first base station, and each having a different radio frequency transmission band. The radio resource scheduler may be configured to identify radio frequency resources in use by nearby base stations or other nearby sources of interference. The virtual guard band information may be shared across multiple base stations. The virtual guard band information may be shared across multiple base stations using communication between the multiple base stations using an X2 protocol. The virtual guard band information may be shared across multiple base stations using the base station coordination node. The base station coordination node acts as a gateway between the base station and a core network. A radio resource scheduler at a second base station can also be configured to receive non-overlapping frequency allocation information from the base station coordination node.

In another embodiment, a method is disclosed, comprising: for a base station transmitting in an allocated frequency band that is adjacent to an adjacent in-use frequency band, consulting a device configuration to determine what frequency bands are assigned for use by the base station; assessing a nearby radio frequency environment for interfering frequencies; identifying a virtual guard band of radio resources within the allocated frequency band that cause less interference to transmissions in the adjacent in-use frequency band; and installing rules in a scheduler at the base station to reduce use of the identified virtual guard band radio resources.

The method may further comprise reducing interference by allocating frequencies at a base station coordination node for each of a first and a second base station, such that the frequencies used by the first base station do not overlap the frequencies used by the second base station. The method may further comprise dynamically adjusting the virtual guard bands. The method may further comprise identifying a radio resource that should not be used and communicating it via an X2 protocol message to a second base station. The method may further comprise increasing utilization of resource blocks in a middle or far end of an allocated frequency band relative to a set of frequencies in the virtual guard band.

DETAILED DESCRIPTION

Figure 1:
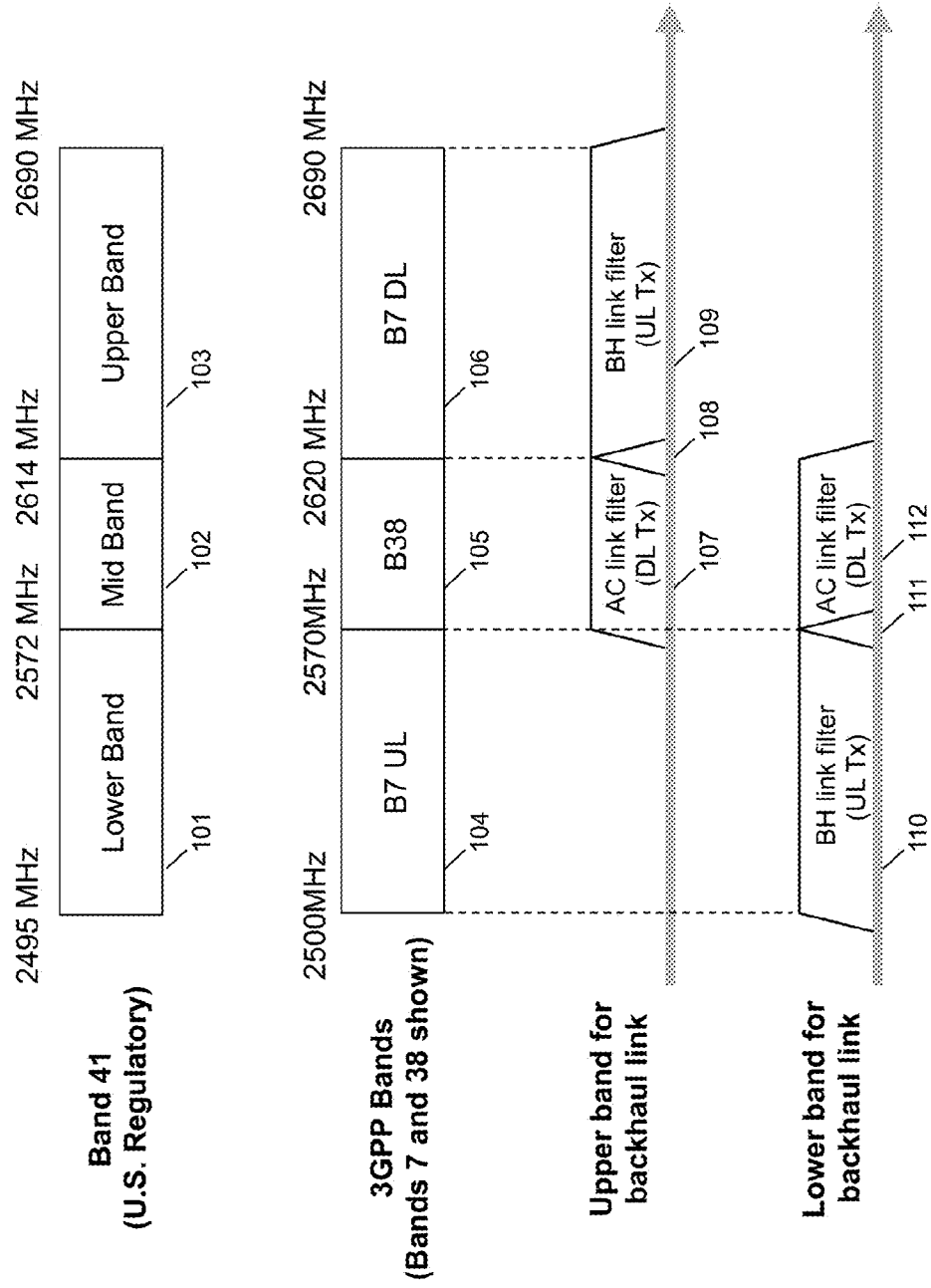
FIG. 1 is a schematic diagram of a virtual guard band, in accordance with some embodiments.

In some embodiments, inter-cell interference cancellation (ICIC) techniques may be used to create virtual guard bands. Virtual guard bands may provide a lower noise floor for arbitrary frequency bands adjoining a frequency band designated for use. The virtual guard bands may provide the effect of radio frequency filtering without the use of a hardware filter. Alternately, virtual guard bands may be used in conjunction with a hardware filter to lower the required performance specifications of the hardware filter.

The ICIC techniques may include the use of X2 communications between base stations or cells, optionally through an intermediary coordination node. One ICIC technique that may be used is to send a request from a source to a target base station to register certain resource blocks (RBs) or subcarriers, as if the source base station would like to use those resource blocks or subcarriers. This causes the resource blocks to be designated for non-use at the target base station. The ICIC techniques may also include the use of time domain coordination, as well as frequency domain coordination. 3GPP Release 10 Enhanced ICIC (eICIC) is specifically designed to permit time domain coordination in heterogeneous networks, and may be used in conjunction with the methods described herein in some embodiments. Interference may be mitigated on control channels as well as traffic channels, with or without the use of enhanced ICIC, in some embodiments.

Virtual guard bands may be used in certain embodiments where receive and transmit antennas, multiple antennas, multiple transmitters, or even multiple base stations, etc., are co-located in the same physical location or even in the same device. In such cases, virtual guard bands may enable acceptable performance in such otherwise-challenging environments. Such a situation may occur for a femto cell combined with a wireless backhaul link. In some embodiments, a greater guard band may be provided over what is required by the 3GPP specification.

In some embodiments, ICIC across different LTE bands, specifically, the leading and trailing edges of the mid band, may be used to lower the noise floor on the band edge. X2 may be used as the protocol for coordinating the ICIC functionality between two or more cells. ICIC may be coordinated by a central server, for example, a coordinating node situated between the base stations and a core network, as described herein.

In some embodiments, various ICIC methods may be used to lower the noise floor on the band edge, thereby relaxing the required specification of the filters in the system. For example, in the case that an upper band above the access band is used for the backhaul link, X2-managed ICIC may be used to lower the noise floor for the leading edge (~2620 MHz) of the access link filter, by assigning for use fractional frequencies that are on the lower end of the mid band, so that downlink transmissions are sent via an isolated portion of the mid band. In the case a lower band below the access band is used for backhaul, X2-managed ICIC may assign fractional frequencies at the upper end of the mid band. Other examples of ICIC are also known and may be used.

The function of assigning resource blocks is typically performed by a scheduler at an eNodeB. In some embodiments, resource blocks may be assigned for use by a central scheduler located in the network at a coordinating node managing several eNodeBs, thereby enabling the creation of virtual guard bands. The guard bands are virtual because the bands are physically allocated for use for the operator, but are not used based on rules present at the scheduler. The virtual guard bands are dynamic in that they may be turned on and off and made larger and smaller as needed. In some embodiments, a central coordinating node may provide hints, allocations, priorities, reservations, or other information to enable a scheduler at the edge of the network in an eNodeB to perform scheduling while ensuring that the scheduling provides virtual guard bands.

In some embodiments, a rule-based system may be used to identify which resource blocks, subcarriers, or frequencies should be avoided. The input to the rule-based system can be a set of frequencies that is in use. For example, a base station configured to use 2.4 GHz Wi-Fi for wireless backhaul may use the specific Wi-Fi channel to identify virtual guard bands, or frequencies that should be avoided for use. The virtual guard bands may then be incorporated into scheduling of resources at that base station or at neighboring base stations.

Coordination of virtual guard bands may be possible within a single base station, in some embodiments. For example, a base station may be a multi-radio access technology (multi-RAT) base station, and may use both 2.4/5 GHz Wi-Fi and 3G/4G radio frequencies. One RAT may be used for backhaul (providing connectivity to a core network or the Internet) and another RAT may be used for access (allowing handsets and other user devices to connect to the base station for connectivity). When using a particular 3G/4G band, or Wi-Fi channel, the base station may identify whether a virtual guard band is appropriate between the access radio and the backhaul radio.

Coordination of virtual guard bands may also be possible across multiple base stations, in some embodiments. For example, the base station described in the preceding paragraph may be part of a mesh network of similar base stations. To prevent interference of the base stations with one another, the base stations may communicate their operating frequency bands and resource allocations to each other, and/or may communicate virtual guard bands that should not be used to each other. Communication may occur directly via, e.g., point-to-point microwave links, or may occur via internet protocol (IP) routing through the mesh network. Communication may involve the use of an X2 protocol extension.

Coordination of virtual guard bands may also be possible across multiple base stations using a coordinating node, in some embodiments. For example, the mesh network of base stations described in the preceding paragraph may be in communication with a centralized coordination server. The coordination server may perform one or more of the functions described herein, including: identifying the bands in use at one base station or across multiple base stations; identifying appropriate guard bands based on the bands in use; and sharing the resource allocations and/or the virtual guard bands/resource exclusions across multiple base stations. The coordination server may use an X2 protocol extension or may use an S1 protocol extension.

In some embodiments, a highly linear transmitter on a complementary metal-oxide semiconductor (CMOS) chip may be combined with an off-chip standalone power amplifier. The off-chip PA is permitted to have a relaxed filter specification by the use of a highly linear Tx signal chain with digital pre-distortion (DPD) for the on-chip Tx, which reduces adjacent channel leakage. The on-chip Tx is also configured to have increased output power and efficiency within a specific range, such as between 0 dBm to 10-15 dBm, and/or output power of up to 15+ dBm. This leaves 6-10 dB gain to be obtained in the off-chip PA, further permitting the off-chip PA to have a relaxed filter specification. This enables the use of a lower-cost, smaller off-chip PA.

CMOS transmitters exist that provide this type of high linearity using DPD, power of 15+ dBm, and nearly 50% peak efficiency, and are suitable for pairing with many off-chip PAs. The greater efficiency of the transmit chain reduces power draw by the transmit chain itself, but also permits the use of a more efficient off-chip PA. In some embodiments, filtering may be provided at a receive end; in some embodiments, filtering may be provided at a transmit end.

In some embodiments, three tunable filters (low band, mid band and upper band) can dynamically (at configuration time) cover the low, mid, and upper bands individually. These filters may be situated in the on-chip transmit chain, in some embodiments, and in fact may be best suited before the PA in the transmit chain. A separate duplexer may be used for band 41. Three of the same filter may also be used, wherein each is tuned to a different center frequency.

As an example, for a desired 15 dB backhaul/access directional antenna separation, and the 0.127 m minimal separation, 22 dB free space path loss is permitted. We can derive the 80 dB stopband attenuation from the dynamic range requirements. In the Rx path, we can use an active high-Q (Q>400) bandpass filter, combined with a active Tx jammer cancellation circuit, to achieve over 60 dB rejection at around 25 MHz offset with fairly low cost. More accurate calibration and tuning may achieve higher rejection at closer frequency separation, up to 80 dB and beyond.

The use of tunable filters may benefit in that the system described herein may be used with a variety of spectral bands, or may be used with one set of bands in one location and another set of bands in another location.

In one embodiment, a coordinating node, such as a Parallel Wireless LTE Access Controller (LAC), which may be located in a core network, is coupled with each of a first and a second base station, which may be LTE base stations (eNodeBs), and which may also be Parallel Wireless Converged Wireless Systems (CWSes) with additional wireless capability, such as Wi-Fi backhaul and/or access capability. The LAC may have an X2 interface connection to each CWS.

The two CWSes may produce interference with each other for a user equipment (UE), by causing the UE to be fed by both CWS signals. This cell-edge UE has poor signal from both CWS 1 and CWS 2, which means there will be interference, high error rate, impacting user performance. With the help of variable attenuators, a reduced throughput effect can be viewed at a test bench using monitoring equipment on the UE and/or at the base station. The CWSes may also send information to the LAC pertaining to, e.g., UE performance metrics such as throughput, and/or error rate. The CWS can send the information, e.g., pertaining to interference/throughput, from the CWS at the LAC, via the X2 interface. In some embodiments, a method using variable attenuators to simulate interfering base stations may be used to test performance of ICIC as described herein.

In some embodiments, the LAC may have a command line interface and may be able to turn on ICIC functionality via a command line. When ICIC is enabled, the LAC may send ICIC information to either or both CWSes. The ICIC information may be a request to start ICIC, or information pertaining to an ICIC process performed at the LAC, or scheduling information for performing ICIC, or some combination of the above, or other ICIC information. This ICIC information may be sent via the X2 interface connection to each CWS.

In some embodiments, the LAC may run an algorithm and decide what is best for each CWS, in some cases attempting to enable each CWS to get a fair amount of throughput. The LAC may also send back information guiding each CWS, so that each CWS can schedule at its node such that there will be less error rate and increased performance for the cell edge user.

A network operator may use the disclosed systems and methods to improve performance and user experience for users in challenged cell edge conditions and enable dense heterogeneous networks. Improved handover rate and better VoLTE quality may also be obtained. Use of adjacent frequency bands and Wi-Fi channels may also be enabled.

System design can thus enable the use of relatively inexpensive filters to achieve high performance.

In a further embodiment, fractional frequency reuse (FFR) may be enhanced using the techniques described herein. For example, the base station may be using an FFR scheme in which cell edge users are assigned frequencies that do not interfere with the cell edge users of neighboring cells. A particular cell may utilize a frequency band that is adjacent to another frequency band. Within the FFR-identified frequency band, the base station may identify a virtual guard band such that a portion of the FFR-identified frequency band is avoided or excluded from use in order to provide improved signal performance for the adjacent cell. The portion of the FFR-identified frequency band that is closest to the adjacent cell's frequency band would be avoided or excluded from use. In some embodiments, this exclusion may be performed at a resource block level by requiring a scheduler to follow certain rules. The scheduling rules may be hard rules or soft rules, in that the rules may be configured to be relaxed, for example, when the channel is congested and additional capacity is needed.

In a further embodiment, a white space database, such as the Google TV White Space Spectrum Database, may be consulted by an automated process to identify which frequencies are in use in the physical vicinity of the transmitting station. The white space database may be used to identify which frequencies or radio resources are available to the current base station.

In some embodiments, an element management system could be used to provision frequencies to be used as virtual guard bands. An element management system may be used to manage various characteristics of base stations in the network, and may also be used to identify specific bands that are used by each base station in the network.

In some embodiments, virtual guard bands may be identified at a radio resource planning phase.

In some embodiments, information may be shared that may include identification of a radio frequency resource that is in use followed by identification of radio resources that should not be used.

In some embodiments, identification of a radio resource that should not be used, and communicating it via a coordinating message, such as an X2 protocol message, to one or more other base stations.

In some embodiments, a base station transmitting in a given frequency band that is adjacent to another in-use frequency band can identify radio resources within the given frequency band that cause the least interference to transmissions in the adjacent in-use frequency band. This may entail, for example, using resource blocks or frequency subcarriers that are higher or lower in frequency than might be identified in an ordinary resource reservation process. This may entail increasing the number of resource blocks or frequency subcarriers that are in use in the middle or far end of an allocated frequency band, in some embodiments.

FIG. 1 is a schematic diagram of a virtual guard band, in accordance with some embodiments. Bands 101-106 as shown are frequency bands that are allocated for service, shown roughly in proportion to their size and arranged in order from lower frequency to higher frequency. Band 101 is a lower band of U.S. regulatory band 41, which is a time-division duplexed band used in the United States for Federal Communications Commission (FCC) broadband radio service (BRS) and educational broadband service (EBS). Band 102 is a mid band of FCC band 41 (BRS/EBS). Band 103 is an upper band of the same band. Bands 104-106 are shown overlapping with bands 101-103 because they are coextensive in frequency. Band 104 is an uplink band for 3GPP Band 7, defined by 3GPP TS 36.101 for LTE and TS 25.101 for UMTS, and each incorporated herein in its entirety. 3GPP bands used in the LTE standard are designed to use different bands for uplink and downlink, and for those bands to be separated by a space (also sometimes called a guard band). Band 105 is not used by 3GPP Band 7 but is instead used by 3GPP Band 38. Band 106 is the downlink band for 3GPP band 7. Band 38 is a time-division duplexed (TDD) band. Band 7 is a frequency-division duplexed (FDD) band.

Below frequency bands 101-103 and 104-106, a filter configuration is shown. Filter 107 and filter 109 are used for an upper band for a backhaul link of a base station. Filter 107 is for downlink transmission and filter 109 is for uplink transmission. Filter 110 and filter 112 are used for a lower band for a second backhaul link of the same base station or a different base station. Filter 110 is for uplink transmission and filter 112 is for downlink transmission. Filter 107 is used to provide radio frequency (RF) filtering for a frequency used by an access link. Filter 109 is used for RF filtering for a backhaul link. Filters 107 and 109 are on one RF transceive chain and filters 110 and 112 are on another RF chain (thus filters 107 and 112 are applied to the same frequencies but are independent). The two receive chains may be on a single base station, or on two base stations.

As depicted, the real-world performance of each of filters 107, 109, 110, 112 is not perfect. Some energy that is not filtered out from adjacent bands leaks into the receive chain; this is shown by the widening base of the filter in the diagram. Overlapping section 108 is a frequency range where neither filter 107 nor filter 109 is able to completely block RF energy from the adjoining band. Frequencies in this frequency range experience interference, low signal-to-noise ratios, and degraded performance. Similarly, overlapping section 111 is a frequency range where neither filter 110 nor filter 112 can completely block RF energy from the adjoining band. Where the words "overlap" or "overlapping" are used herein, they may be understood to mean physically overlapping, simultaneously in use, currently interfering, or potentially interfering.

Overlapping sections 108 and 111 are thus good candidates for the application of a guard band. However, in some cases a literal guard band is not possible to deploy between frequency blocks 104 and 105, or between frequency blocks 105 and 106. For example, a base station may be using both FCC band 41 and 3GPP band 7, or using both 3GPP bands 7 and 38. In this case a virtual guard band may still be used.

Using a virtual guard band entails reducing the use of overlapping frequency ranges, such as frequency ranges 108 and 111. This reduction may be accomplished by identifying what radio interference is in the area, identifying a subset of a prior-selected frequency band that should not be used (the virtual guard band), and transmitting on a subset of frequencies that is not part of the virtual guard band, thereby refraining from transmission on those frequencies. This reduction may also be accomplished by using this virtual guard band at a scheduler in the base station. This reduction may also be accomplished by communicating this virtual guard band across multiple base stations using, for example, an X2 coordination protocol. This reduction may also be accomplished by sharing this virtual guard band across multiple base stations using a coordinating node.

The size of overlapping frequency ranges 108 and 111 is determined by the passband performance of RF filters 107, 109, 110, 112. Accordingly, the size of a required virtual guard band may be assessed in conjunction with RF sampling, to determine how much energy is being radiated along what frequencies, and with RF passband profiling of filters embedded in the base stations. In the absence of other information, a guideline of 10% of frequencies above and below the desired frequency band may be used to establish parameters for a virtual guard band.

Figure 2:
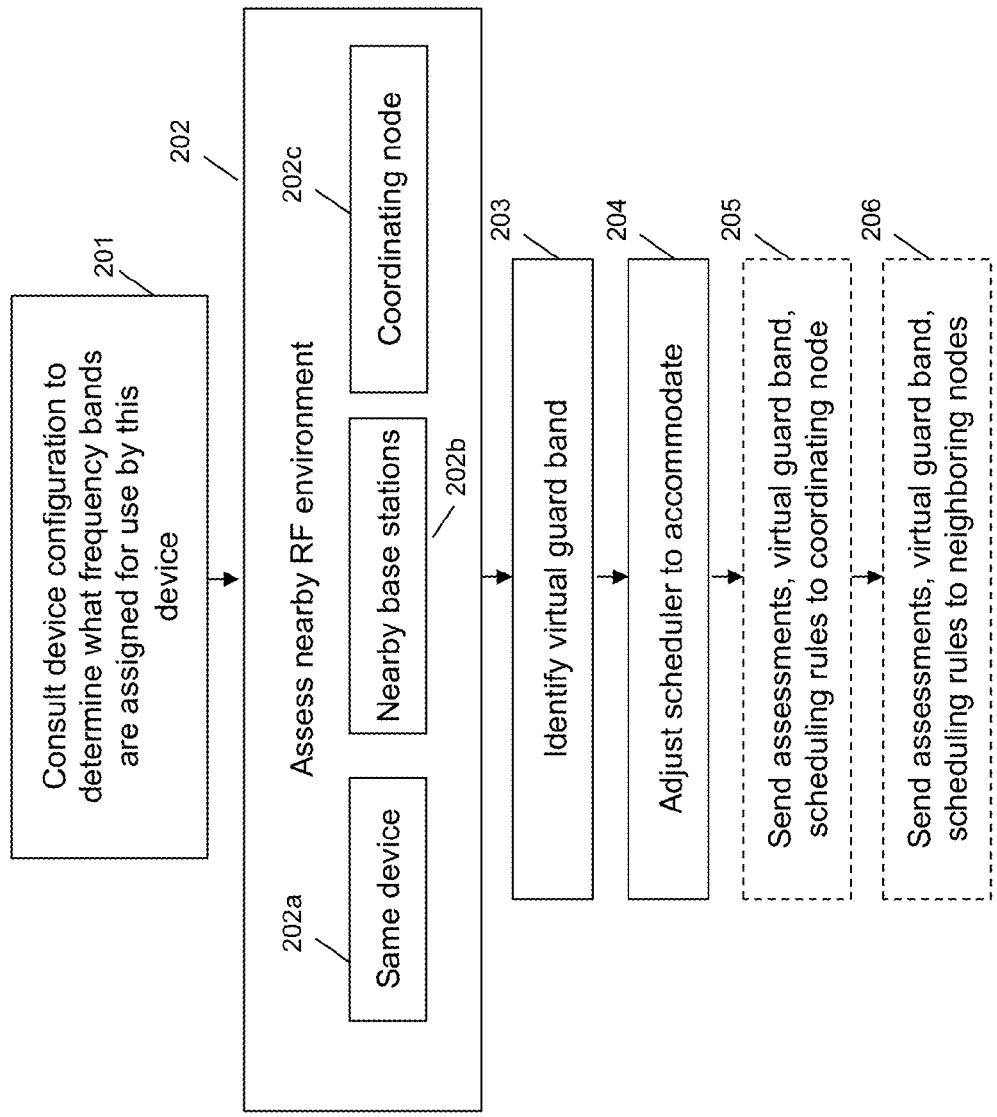
FIG. 2 is a flowchart of an exemplary method, in accordance with some embodiments.

FIG. 2 is a flowchart depicting a method for using a virtual guard band, in accordance with some embodiments. At step 201, a device configuration is consulted to determine what frequency bands are assigned for use by this device. For example, a base station may access its own configuration files to determine that it has both a 2.4 GHz Wi-Fi backhaul radio and a 4G LTE Band 7 access radio. Step 201 may also include profiling of one or more RF filters in the device to determine whether an operational effectiveness of one or more filters would benefit from the use of a virtual guard band. At step 202, the nearby RF environment may be assessed. For example, one or more of the following may be assessed: the RF environment at the same device (202a); the network environment at nearby base stations (202b); consulting a coordinating node for further information (202c).

Step 202a may include, for example, noting that a particular base station uses both LTE and Wi-Fi, and that the LTE band in use is adjacent to a Wi-Fi channel, and providing the specific frequencies in use to the next step 203. Step 202a may also include, for example, noting that the base station is using two adjacent Wi-Fi channels for access and backhaul or for uplink and downlink. Step 202a may also include, for example, noting that a powerful transmit RF chain is adjacent to a less-powerful receiver. Step 202a may also involve activating an RF sniffing capability using a hardware RF transceiver functionality, to determine what frequencies are in use at the present device.

Step 202b may include, for example, identifying interfering transmission bands at nearby base stations. The list of nearby base stations may be determined from a user equipment (UE) measurement report, neighbor relations table, or from a coordinating node. If a coordinating node is present, it may also be able to access information regarding whether a virtual guard band is needed, or whether the signal strength on a particular band at the nearby base station does not warrant a virtual guard band (for example, if transmission strength at a neighboring base station is weak or if receive strength at the present base station is strong). In the case that a base station is in a mesh network, other nodes on the mesh network may be queried for RF usage. Information regarding load, congestion, data throughput, error rate, packet drop rate, radio signal strength including signal measurements such as signal-to-noise ratio and received signal strength indicators (RSSIs), may be obtained.

Step 202c may include, for example, connecting to a coordinating node and getting information about the network. If the coordinating node manages the network, it may have complete information about transmissions and frequency bands in the area. If the coordinating node does not manage the network or is managing only a subset of the network, the coordinating node may still have information from several other base stations about current and local network conditions.

At step 203, specific frequencies, resources, or resource blocks that constitute a virtual guard band may be identified, by determining whether each frequency block is in an overlapping frequency range as described above. These resources may then be marked not to be used by the scheduler in step 204. The scheduler may be a Wi-Fi scheduler or an LTE scheduler, or a combined scheduler, in some embodiments. Multiple schedulers may be in use for different transceivers, and in this case the virtual guard band instruction may be sent to the appropriate scheduler. The instructions may be installed in the scheduler as a persistent rule to be used during every scheduling window, in some embodiments, so that the rule takes effect over more than one transmission time interval (TTI). In some embodiments, these resources may be marked not to be used except under certain circumstances. In some embodiments, these resources may be not be marked but may rather be sent to the back of the queue for allocation, so that they are allocated after other resources in the queue have been allocated. These rules may be installed at the scheduler in the base station. The scheduling rules may operate in conjunction with fractional frequency reuse (FFR) rules. In some embodiments, the rules may be set to apply only to transmissions from a particular device, such as the device running the method.

At step 205, the assessment of the nearby network environment may be sent to the coordinating node, which may collect all of the reported network environment reports, and may use these to change what bands it reports as in use. Similarly, the identified virtual guard band resources may be sent to the coordinating node. Similarly, the scheduling rules may be sent to the coordinating node. The coordinating node itself may perform the same steps shown in FIG. 2, and may provide one or more of network environment information, virtual guard band information, and scheduling rule information specific to one or more base stations, so that at any time a base station may consult the coordinating node and obtain one or more of these types of information to be installed at the base station. This information may constitute hints, allocations, priorities, reservations, or another method for specifying scheduling-related information. The coordinating node may also perform scheduling of radio resources on behalf of one or more base stations, in some embodiments, and may install rules according to this method to accommodate a virtual guard band in its scheduler.

Other sources may also be consulted at step 202 for relevant information. For example, a public radio white space database may be consulted to determine whether frequencies are being used adjacent to the ones identified as allocated for use at step 201. As another example, the frequency bands of LTE, UMTS, and others are well-known and are specified in 3GPP technical standards, IEEE technical standards, etc. Virtual guard bands may be set up to reduce usage of radio resources at the edge of the bands allocated for use, even absent any interference. This may be useful to relax a filter specification of an RF filter in the device (or may compensate for a relaxed filter specification in the device).

Figure 3:
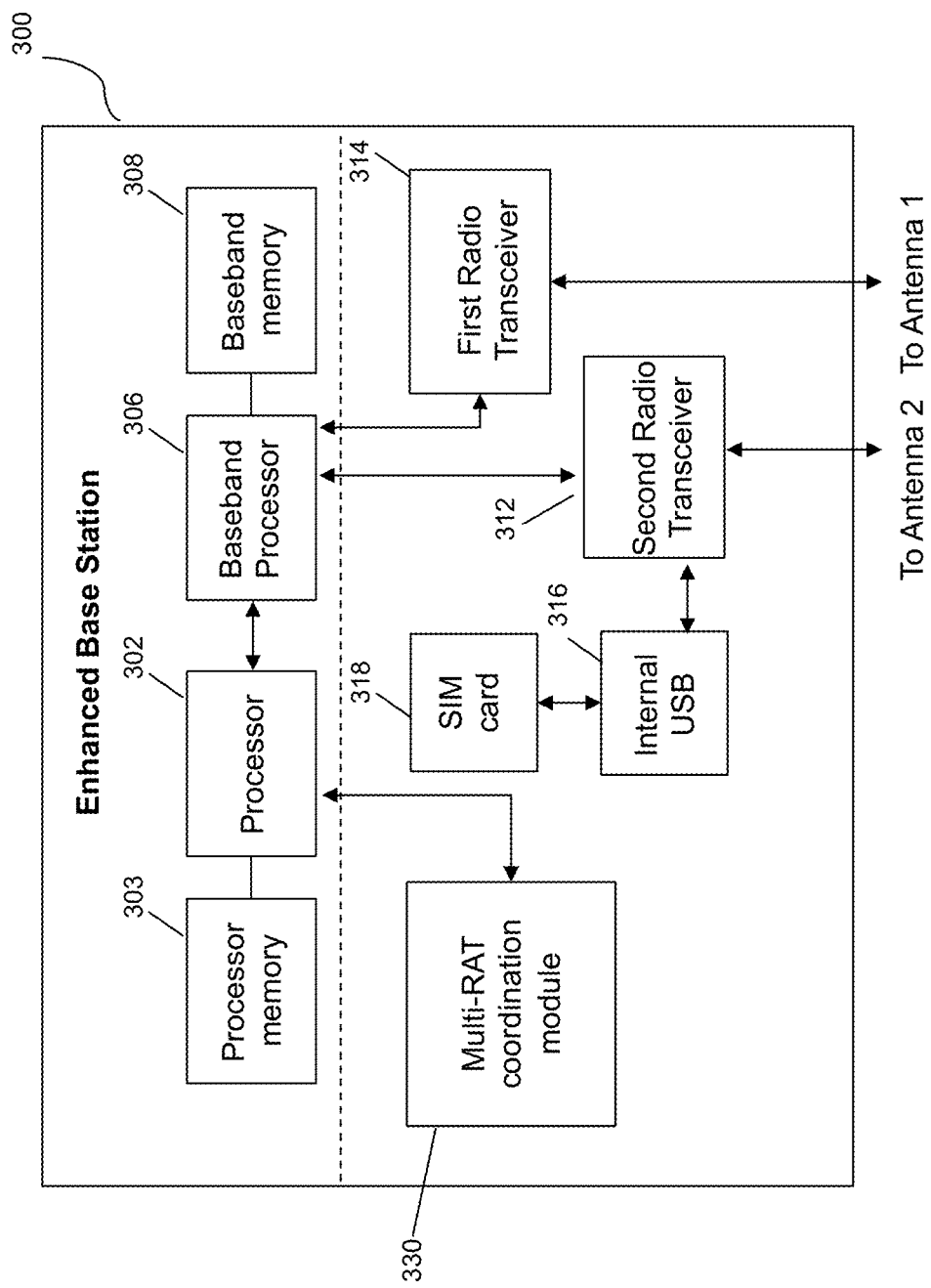
FIG. 3 is a schematic diagram of an enhanced base station, in accordance with some embodiments.

FIG. 3 is a schematic diagram of an enhanced base station, in accordance with some embodiments. Enhanced base station 300 may be an eNodeB for use with LTE, and may include processor 302, processor memory 303 in communication with the processor, baseband processor 306, and baseband processor memory 308 in communication with the baseband processor. Enhanced eNodeB 300 may also include first radio transceiver 314 and second radio transceiver 312, internal universal serial bus (USB) port 316, and subscriber information module card (SIM card) 318 coupled to USB port 314. In some embodiments, the second radio transceiver 312 itself may be coupled to USB port 316, and communications from the baseband processor may be passed through USB port 316.

In some embodiments, processor 302 may be coupled to a multi-rat coordination module 330. In some embodiments, a GPS module (not shown) may provide information to the processor regarding the location of the mobile base station. The GPS module may be connected to a GPS antenna (not shown) located outside the device, preferably on the top or roof of the exterior of a vehicle in which the base station is mounted, so that the GPS antenna can receive signals from GPS satellites. In some embodiments, the GPS module may provide AGPS functionality, and may cooperate with one or more other wireless modules, such as a Wi-Fi module, to obtain additional information. In environments where the use of the mobile base station is anticipated on a moving vehicle that is underground or out of sight of the sky, another positioning system may be used in conjunction with GPS/AGPS so that the position of the mobile base station may be ascertained at times when GPS is not available. For example, a subway train outfitted with a mobile base station may use other means, such as beacons on the track, to determine position. The position calculated by the GPS module is processed by the processor 302, in some embodiments, to determine velocity. In some embodiments the GPS module can provide the velocity directly.

In some embodiments, processor 302 may be coupled to a CAN bus interface (not shown), which in turn may be coupled electrically to a vehicle CAN bus (not shown) of the vehicle in which the mobile base station is mounted. The CAN bus interface may monitor the CAN bus for vehicle-wide notifications, particularly power-related notifications. The CAN bus interface may also track and store battery information over time, and may also model the performance of the battery over time, so as to enable processor 302 to know if power down is imminent, even without an explicit notification from the vehicle power controller.

Processor 302 and baseband processor 306 are in communication with one another. Processor 302 may perform routing functions, and may determine if/when a switch in network configuration is needed. Baseband processor 306 may generate and receive radio signals for both radio transceivers 314 and 312, based on instructions from processor 302. In some embodiments, processors 302 and 306 may be on the same physical logic board. In other embodiments, they may be on separate logic boards.

The first radio transceiver 314 may be a radio transceiver capable of providing LTE eNodeB functionality, and may be capable of higher power and multi-channel OFDMA. The second radio transceiver 312 may be a radio transceiver capable of providing LTE UE functionality. Both transceivers 314 and 312 are capable o receiving and transmitting on one or more LTE bands. In some embodiments, either or both of transceivers 314 and 312 may be capable of providing both LTE eNodeB and LTE UE functionality. Transceiver 314 may be coupled to processor 302 via a Peripheral Component Interconnect-Express (PCI-E) bus, and/or via a daughtercard. As transceiver 312 is for providing LTE UE functionality, in effect emulating a user equipment, it may be connected via the same or different PCI-E bus, or by a USB bus, and may also be coupled to SIM card 318.

SIM card 318 may provide information required for authenticating the simulated UE to the evolved packet core (EPC). When no access to an operator EPC is available, local EPC 320 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 300 is not an ordinary UE but instead is a special UE for providing backhaul to device 300.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 314 and 312, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 302 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included. The SON module may be configured to provide transmit power increase/decrease functionality, radio band switching functionality, or communications with another remote SON module providing, for example, these types of functionality, in some embodiments. The SON module may be used to perform the steps of FIG. 2 and may execute on the general purpose processor 302.

Processor 302 may identify the appropriate network configuration, and may perform routing of packets from one network interface to another accordingly. Processor 302 may use memory 303, in particular to store a routing table to be used for routing packets. Baseband processor 306 may perform operations to generate the radio frequency signals for transmission or retransmission by both transceivers 314 and 312. Baseband processor 306 may also perform operations to decode signals received by transceivers 314 and 312. Baseband processor 306 may use memory 308 to perform these tasks.

Figure 4:
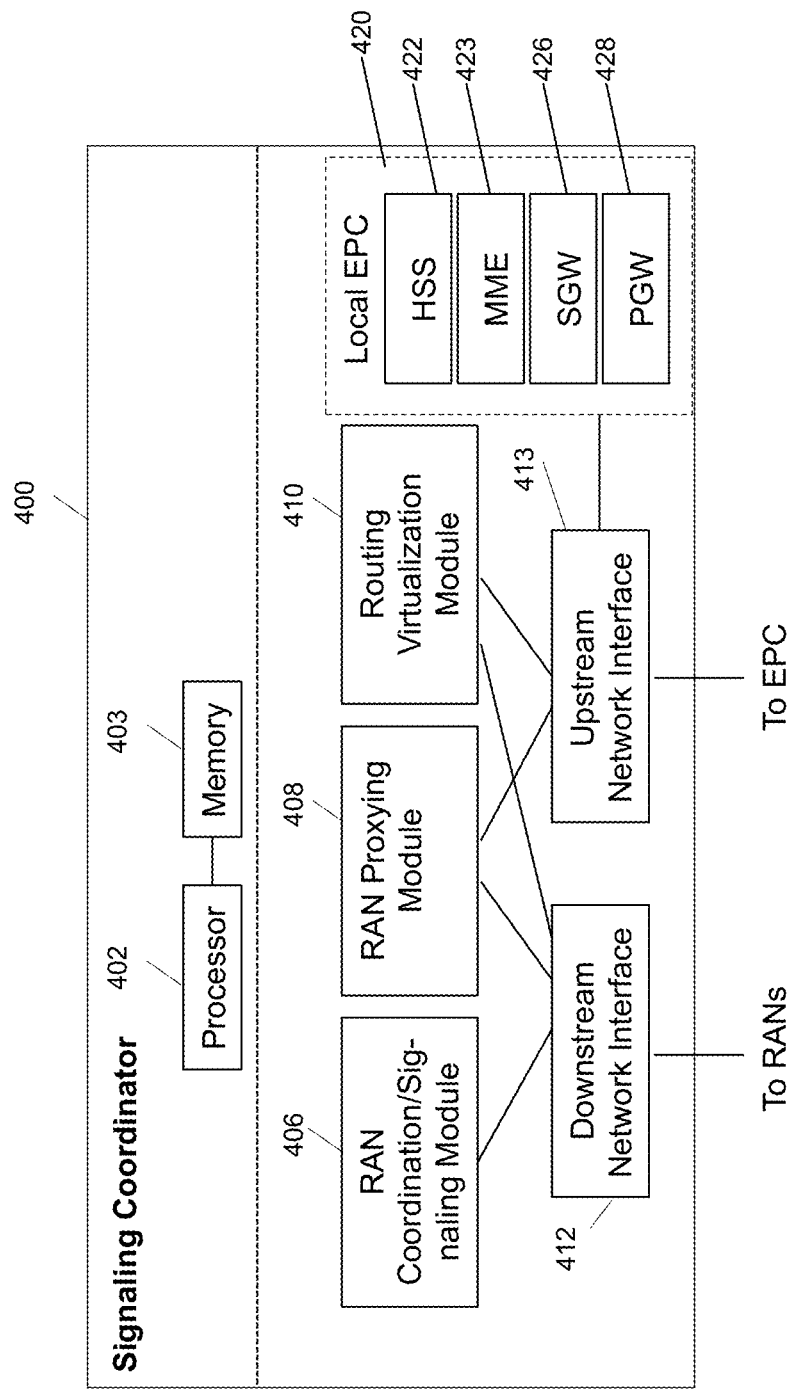
FIG. 4 is a schematic diagram of a signaling coordinator server, in accordance with some embodiments.

FIG. 4 is a schematic diagram of a signaling coordinator server, in accordance with some embodiments. Signaling coordinator 400 includes processor 402 and memory 403, which are configured to provide the functions described herein. Also present are radio access network coordination/signaling (RAN Coordination and signaling) module 406, RAN proxying module 408, and routing virtualization module 410. In some embodiments, coordinator server 400 may coordinate multiple RANs using coordination module 406. In some embodiments, coordination server may also provide proxying, routing virtualization and RAN virtualization, via modules 410 and 408. In some embodiments, a downstream network interface 412 is provided for interfacing with the RANs, which may be a radio interface (e.g., LTE), and an upstream network interface 414 is provided for interfacing with the core network, which may be either a radio interface (e.g., LTE) or a wired interface (e.g., Ethernet). Signaling storm reduction functions may be performed in module 406.

Signaling coordinator 400 includes local evolved packet core (EPC) module 420, for authenticating users, storing and caching priority profile information, and performing other EPC-dependent functions when no backhaul link is available. Local EPC 420 may include local HSS 422, local MME 423, local SGW 426, and local PGW 428, as well as other modules. Local EPC 420 may incorporate these modules as software modules, processes, or containers. Local EPC 420 may alternatively incorporate these modules as a small number of monolithic software processes. Modules 406, 408, 410 and local EPC 420 may each run on processor 402 or on another processor, or may be located within another device.

Figure 5:
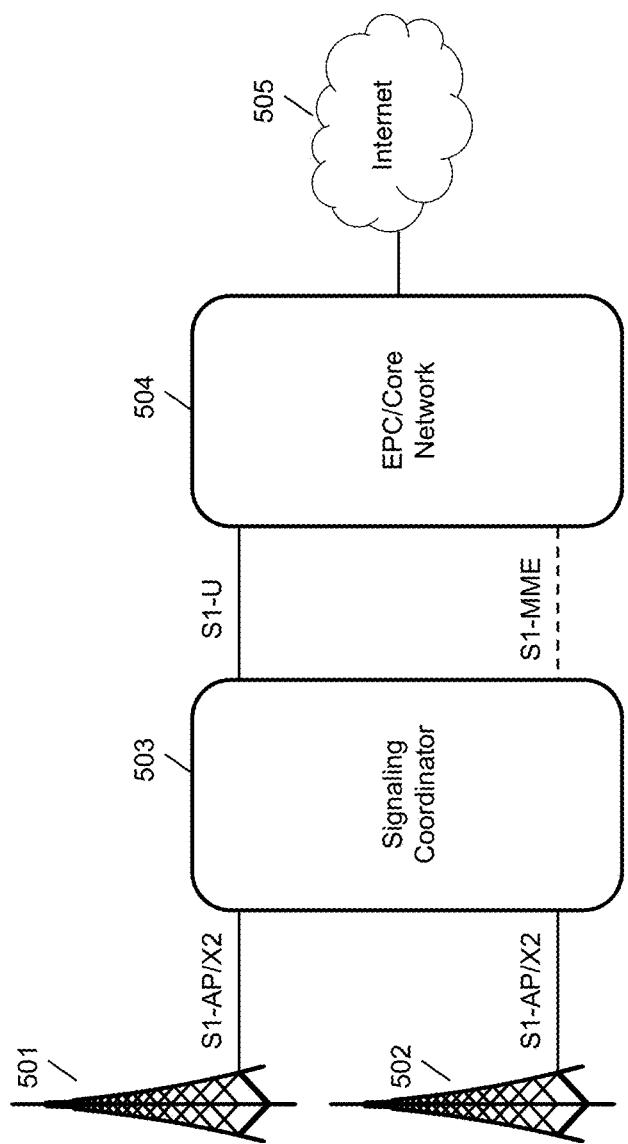
FIG. 5 is a system architecture diagram of an exemplary network configuration, in accordance with some embodiments.

FIG. 5 is a system architecture diagram of an exemplary network configuration, in accordance with some embodiments. Base stations 501 and 502 are connected via an S1-AP and an X2 interface to coordination server 506. Base stations 502 and 504 are eNodeBs, in some embodiments. Coordination server 503 is connected to the evolved packet core (EPC)/Core Network 504 via an S1 protocol connection and an S1-MME protocol connection. Coordination of base stations 501 and 502 may be performed at the coordination server. In some embodiments, the coordination server may be located within the EPC/Core Network 504. EPC/Core Network 504 provides various LTE core network functions, such as authentication, data routing, charging, and other functions. In some embodiments, mobility management is performed both by coordination server 503 and within the EPC/Core Network 504. EPC/Core Network 504 provides, typically through a PGW functionality, a connection to the public Internet 505.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the Wi-Fi frequency bands described herein may be channels determined by the respective IEEE 802.11 protocols, which are incorporated herein to the maximum extent permitted by law. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

Those skilled in the art will recognize that multiple hardware and software configurations may be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention may be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

Although the scenarios for interference mitigation are described in relation to macro cells and micro cells, or for a pair of small cells or pair of macro cells, the same techniques may be used for reducing interference between any two cells, in which a set of cells is required to perform the CoMP methods described herein. The applicability of the above techniques to one-sided deployments makes them particularly suitable for heterogeneous networks, including heterogeneous mesh networks, in which all network nodes are not identically provisioned.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods may be combined. In the scenarios where multiple embodiments are described, the methods may be combined in sequential order, in various orders as necessary.

Although certain of the above systems and methods for providing interference mitigation are described in reference to the Long Term Evolution (LTE) standard, one of skill in the art would understand that these systems and methods may be adapted for use with other wireless standards or versions thereof.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims. For example, the coordinating node may process incoming requests for virtual guard bands using a client-server request-based procedure, and may handle incoming requests out of order based on the originating source base station of the request.

The invention claimed is:

1. A system, comprising:
a radio resource scheduler at a first base station configured to:
identify radio frequency resources in use by the first base station,
identify radio frequency resources to be reserved as virtual guard bands to reduce adjacent band interference, and
install virtual guard band rules for reducing interference with adjacent bands; and
a base station coordination node in communication with the base station configured to:
answer queries regarding radio frequencies in use by neighboring base stations;
receive virtual guard band information from the first base station; and
send virtual guard band information to a second base station.

2. The system of claim 1, wherein the virtual guard band information is hints, allocations, priorities, reservations, or scheduling instructions for avoiding certain radio resources, radio resource blocks, or frequencies.

3. The system of claim 1, wherein the radio resource scheduler is coupled to an access transceiver and a backhaul transceiver, each at the first base station, and each having a different radio frequency transmission band.

4. The system of claim 1, wherein the radio resource scheduler is configured to identify radio frequency resources in use by nearby base stations or other nearby sources of interference.

5. The system of claim 1, wherein the virtual guard band information is shared across multiple base stations.

6. The system of claim 1, wherein the virtual guard band information is shared across multiple base stations using communication between the multiple base stations using an X2 protocol.

7. The system of claim 1, wherein the virtual guard band information is shared across multiple base stations using the base station coordination node.

8. The system of claim 1, wherein the base station coordination node acts as a gateway between the base station and a core network.

9. The system of claim 1, further comprising a radio resource scheduler at a second base station configured to receive non-overlapping frequency allocation information from the base station coordination node.

10. A method, comprising:
- for a first base station transmitting in an allocated frequency band that is adjacent to an adjacent in-use frequency band,
- consulting a device configuration to determine what frequency bands are assigned for use by the first base station;
- assessing a nearby radio frequency environment for interfering frequencies;
- identifying a virtual guard band of radio resources within the allocated frequency band that cause less interference to transmissions in the adjacent in-use frequency band;
- identifying a radio resource that should not be used and communicating the radio resource that should not be used via an X2 protocol message to a second base station; and
- installing rules in a scheduler at the first base station to reduce use of the identified virtual guard band radio resources.

11. The method of claim 10, further comprising reducing interference by allocating frequencies at a base station coordination node for each of the first and a second base station, such that the frequencies used by the first base station do not overlap the frequencies used by the second base station.

12. The method of claim 10, further comprising dynamically adjusting the virtual guard bands.

13. The method of claim 10, further comprising increasing utilization of resource blocks in a middle or far end of an allocated frequency band relative to a set of frequencies in the virtual guard band.

14. The method of claim 10, wherein the first base station is a Long Term Evolution (LTE) base station.

15. The method of claim 10, further comprising sharing, at a base coordination node, the virtual guard band information across multiple base stations using an X2 protocol.

16. The method of claim 10, further comprising using an inter-cell interference cancellation (ICIC) technique at the first base station.

17. The method of claim 10, further comprising communicating between the first base station, the second base station, and the base station coordination node using an X2 protocol.

18. The method of claim 10, further comprising sending a request from the first base station to the second base station to register resource blocks or subcarriers.

19. The method of claim 10, further comprising using time domain coordination or frequency domain coordination.

20. The method of claim 10, further comprising using enhanced ICIC (eICIC) time domain coordination in heterogeneous networks.

21. The method of claim 10, further comprising lowering a noise floor on leading and trailing edges of a mid band of a Long Term Evolution (LTE) band.

22. The method of claim 10, further comprising lowering a noise floor for leading edge of an access link filter by assigning fractional frequencies for use on a lower end of a mid band, thereby sending downlink transmissions via an isolated portion of the mid band.

23. The method of claim 10, further comprising scheduling, at the base coordination node, resource blocks for use at the first base station and the second base station.

24. The method of claim 10, further comprising using the virtual guard band with multiple physically co-located base stations, physically co-located receive and transmit antennas at the first or the second base station, multiple antennas at the first or the second base station, or multiple transmitters in the first or the second base station.

25. The method of claim 10, further comprising using the virtual guard band with multiple physically co-located base stations, wherein at least one base station of the multiple physically co-located base stations is a femto cell base station with a wireless backhaul link.

26. The method of claim 10, further comprising using the virtual guard band with multiple physically co-located base stations, and wherein at least one of the multiple physically co-located base stations is a multi-radio access technology (multi-RAT) base station supporting a plurality of RATs.

\* \* \* \* \*